United States Patent
Pai et al.

(10) Patent No.: US 11,703,732 B2
(45) Date of Patent: Jul. 18, 2023

(54) PIXEL ARRAY SUBSTRATE COMPRISING A PLURALITY OF SIGNAL LINES DISPOSED ON A PLURALITY OF INSULATION PATTERNS EACH HAVING AT LEAST ONE RECESS STRUCTURE FILLED WITH THE SIGNAL LINES

(71) Applicant: Au Optronics Corporation, Hsinchu (TW)

(72) Inventors: Chia-Hui Pai, Hsinchu (TW); Wen-Hsien Tseng, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 17/519,564

(22) Filed: Nov. 4, 2021

(65) Prior Publication Data
US 2022/0206350 A1      Jun. 30, 2022

(30) Foreign Application Priority Data
Dec. 30, 2020   (TW) .................. 109146835

(51) Int. Cl.
*G02F 1/1362*      (2006.01)
(52) U.S. Cl.
CPC .. *G02F 1/136286* (2013.01); *G02F 1/136222* (2021.01)

(58) Field of Classification Search
None
See application file for complete search history.

(56) References Cited

U.S. PATENT DOCUMENTS

| | | | | |
|---|---|---|---|---|
| 2014/0367658 | A1* | 12/2014 | Kwak | H01L 23/562 257/773 |
| 2016/0093644 | A1* | 3/2016 | Ki | H01L 27/1222 257/43 |
| 2017/0288004 | A1* | 10/2017 | Kim | H10K 77/10 |
| 2020/0243563 | A1 | 7/2020 | Choung et al. | |

FOREIGN PATENT DOCUMENTS

| | | | |
|---|---|---|---|
| CN | 107689208 | | 2/2018 |
| CN | 107689208 A | * | 2/2018 |
| CN | 109686243 | | 4/2019 |
| CN | 109686243 A | * | 4/2019 |

* cited by examiner

*Primary Examiner* — Paul C Lee
(74) *Attorney, Agent, or Firm* — JCIPRNET

(57) ABSTRACT

A pixel array substrate including a substrate, multiple insulation patterns, multiple signal lines, and multiple pixel structures is provided. The insulation patterns are disposed on the substrate, and each has at least one recess structure. The signal lines are respectively disposed on the insulation patterns and are respectively filled in the at least one recess structure of one of the insulation patterns. The pixel structures are disposed on the substrate and are electrically connected to the signal lines. A pixel array substrate further including multiple conductive patterns is also disposed.

18 Claims, 8 Drawing Sheets

PIXEL ARRAY SUBSTRATE COMPRISING A PLURALITY OF SIGNAL LINES DISPOSED ON A PLURALITY OF INSULATION PATTERNS EACH HAVING AT LEAST ONE RECESS STRUCTURE FILLED WITH THE SIGNAL LINES

CROSS-REFERENCE TO RELATED APPLICATION

This application claims the priority benefit of Taiwan application serial no. 109146835, filed on Dec. 30, 2020. The entirety of the above-mentioned patent application is hereby incorporated by reference herein and made a part of this specification.

BACKGROUND

Technology Field

The disclosure relates to a display technology, and particularly, to a pixel array substrate.

Description of Related Art

In recent years, with the development of display technology, consumer display devices (e.g., smart TVs and e-sports monitors) have continuously improved their display performance and functions, such as ultra-high resolution, high contrast, high frame rate, anti-peep, stereo display, and the like. To meet the requirements of these specifications, it requires the overall electrical potential of the driving circuit of a display device to be correspondingly improved. For example, in common pixel driving circuits, most signal lines (e.g., data lines or scan lines), active devices, and pixel electrodes have problems with parasitic resistance and parasitic capacitance, resulting in the waveform of the transmission signal to change because of RC delay. This type of signal waveform change may affect the switching characteristics of the active device, thereby affecting the display quality. Especially for display devices with both ultra-high resolution (e.g., 8K4K) and high frame rate (e.g., 120 Hz), the influence of the RC delay effect is even more significantly.

To suppress the RC delay effect, a common method is to increase the width and/or the thickness of the signal line. However, increasing the width of the signal line may cause the loss of the pixel aperture ratio of a liquid crystal display panel. On the other hand, the increase in the thickness of the signal line is likely to cause the uniformity of the film surface to decrease and even affect the overall stress distribution of the circuit substrate, thus subjecting the substrate to fragility. In other words, the current technical methods still need to make a breakthrough in the limitation of their manufacturing process or optical design.

SUMMARY

The disclosure provides a pixel array substrate whose driving circuit has favorable charging and discharging capability.

The pixel array substrate of the disclosure includes a substrate, multiple insulation patterns, multiple signal lines, and multiple pixel structures. The insulation patterns are disposed on the substrate. Each of the insulation patterns has at least one recess structure. The signal lines are disposed on the insulation patterns, respectively. Each of the signal lines is filled in the at least one recess structure of one of the insulation patterns. The pixel structures are disposed on the substrate and electrically connected to the signal lines, respectively.

The pixel array substrate of the disclosure includes a substrate, multiple insulation patterns, multiple signal lines, multiple conductive patterns, and multiple pixel structures. The insulation patterns are disposed on a substrate surface of the substrate and along a configuration direction. A first thickness of the insulation patterns in a thickness direction is greater than a second thickness of the signal lines in the thickness direction. A first width of each of the signal lines in the configuration direction is less than or equal to a second width of each of the insulation patterns in the configuration direction. The conductive patterns are disposed adjacent to the signal lines and electrically insulated from the signal lines. The pixel structures are disposed on the substrate and electrically connected to the signal lines, respectively.

In summary, in the pixel array substrate of an embodiment of the disclosure, the recess structure is disposed on the insulation pattern, and the signal line electrically connected to the pixel structure is disposed on the insulation pattern and filled in the recess structure. Accordingly, the overall resistance of the signal line may be reduced, which contributes to improving the charging and discharging capability of the driving circuit of the pixel array substrate. In the pixel array substrate of another embodiment of the disclosure, with the configuration of the insulation pattern, the distance between the signal line and the conductive pattern may be increased, and thereby the capacitive coupling effect between the signal line and the conductive pattern is suppressed, which contributes to improving the charging and discharging capability of the driving circuit of the pixel array substrate.

DESCRIPTION OF THE EMBODIMENTS

Figure 1:
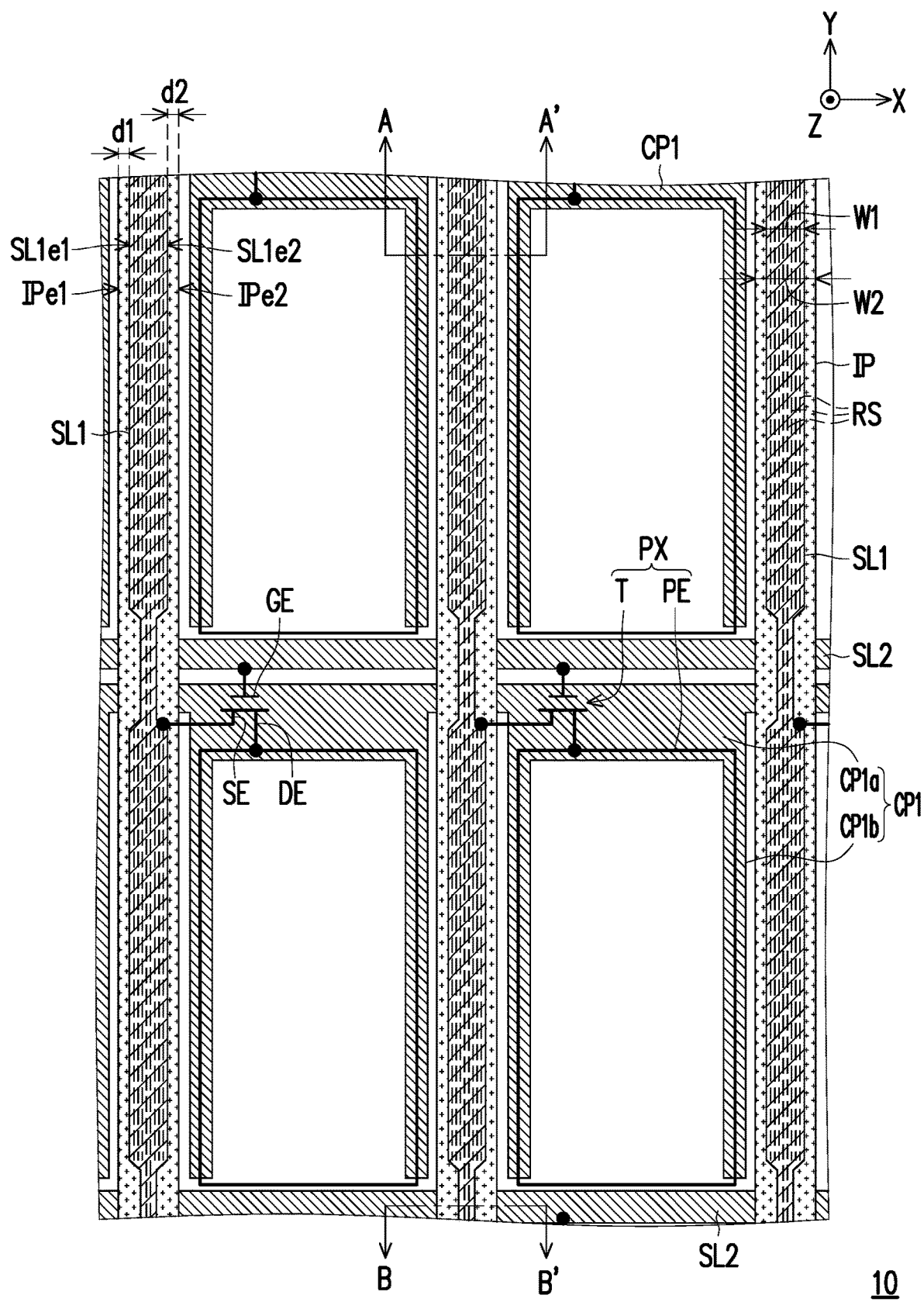
FIG. 1 is a schematic top view of a pixel array substrate according to a first embodiment of the disclosure.

The term "about", "similar", "essentially", or "substantially" as used herein is inclusive of the stated value and means within an acceptable range of deviation for the particular value as determined by people having ordinary skill in the art, considering the measurement in question and the error associated with measurement of the particular quantity (i.e., the limitations of the measurement system). For instance, "about" may mean within one or more standard deviations or, for instance, ±30%, ±20%, ±10%, or ±5% of the stated value. Furthermore, a relatively acceptable range of deviation or standard deviation may be chosen for the term "about", "similar", "essentially", or "substantially" as used herein based on measurement properties, cutting properties, or other properties, instead of applying one standard deviation across all the properties.

In the drawings, thicknesses of layers, films, panels, regions, etc., are exaggerated for the sake of clarity. It should be understood that when a device such as a layer, film, region, or substrate is referred to as being "on", or "connected to" another device, it may be directly on or connected to another device, or intervening devices may also be present. In contrast, when a device is referred to as being "directly on" or "directly connected to" another device, no intervening devices are present. As used herein, the term "connection" may refer to physical connection and/or electrical connection. Furthermore, "electrically connection" may encompass the presence of other devices between two devices.

Reference will now be made in detail to the exemplary embodiments of the disclosure, examples of which are illustrated in the accompanying drawings. Whenever possible, the same reference numerals are used to represent the same or similar parts in the accompanying drawings and description.

Figure 2A:
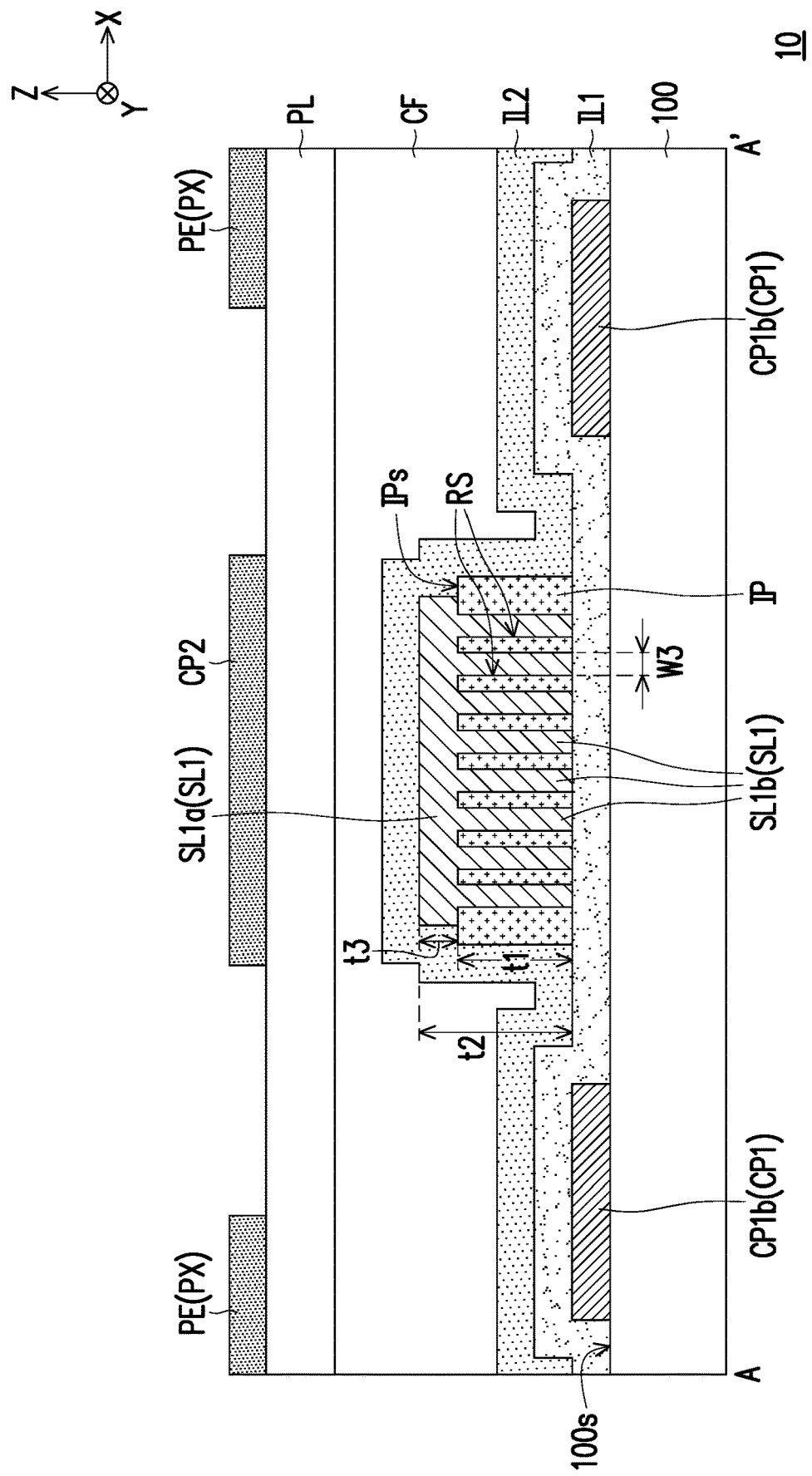
FIG. 2A and FIG. 2B are schematic cross-sectional views of the pixel array substrate of FIG. 1.
Figure 2B:
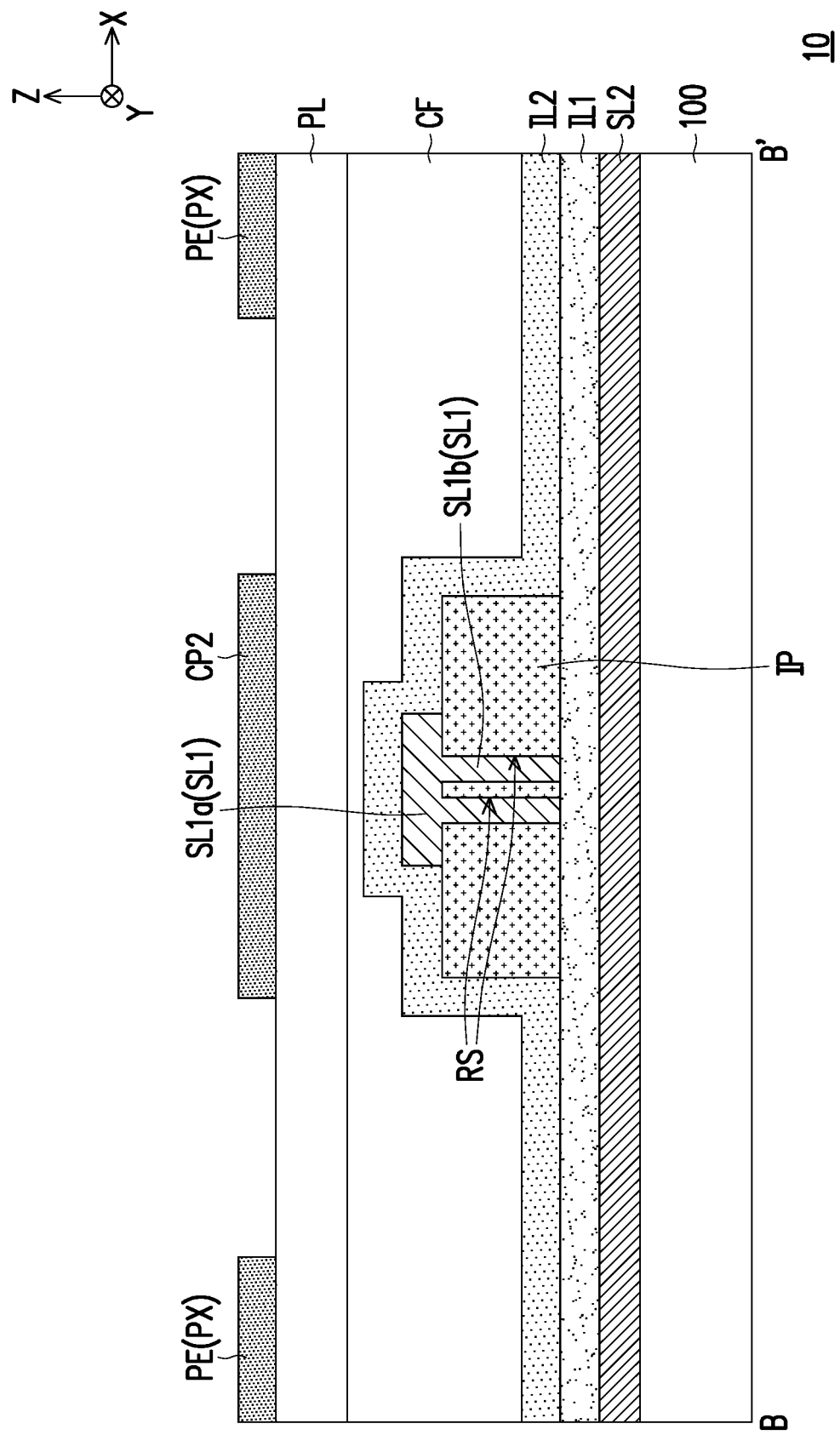

FIG. 1 is a schematic top view of a pixel array substrate according to a first embodiment of the disclosure. FIG. 2A and FIG. 2B are schematic cross-sectional views of the pixel array substrate of FIG. 1. Specifically, for clarity, the illustration of an insulating layer IL1, an insulating layer IL2, a color filter layer CF, a planarization layer PL, and a conductive pattern CP2 of FIG. 2A is omitted in FIG. 1. FIG. 2A and FIG. 2B correspond to the section line A-A' and the section line B-B' of FIG. 1, respectively.

Referring to FIG. 1, FIG. 2A, and FIG. 2B, a pixel array substrate 10 includes a substrate 100, multiple signal lines SL1, multiple signal lines SL2, and multiple pixel structures PX. The signal lines SL1 are disposed along a direction X and extend in the direction Y. The signal lines SL2 are disposed along the direction Y and extend in the direction X. In the embodiment, for example, the signal line SL1 and the signal line SL2 are a data line and a scan line, respectively, but the disclosure is not limited thereto. The signal lines SL1 intersect the signal lines SL2 and define multiple pixel areas, and the pixel structures PX are disposed in the pixel areas.

In the embodiment, the pixel structure PX may include an active device T and a pixel electrode PE electrically connected to each other. The active device T of each pixel structure PX is electrically connected to the pixel electrode PE, a corresponding signal line SL1, and a corresponding signal line SL2. For example, a gate GE, a source SE, and a drain DE of the active device T are electrically connected to the signal line SL2, the signal line SL1, and the pixel electrode PE, respectively. The pixel array substrate 10 may transmit a switching signal (e.g., a pulse signal with high and low voltage levels) to the gate GE of the active device T through the signal line SL2. After receiving the switching signal, the active device T opens or closes the charge transmission channel between the source SE and the drain DE, so that the pixel electrode PE may charge and discharge or may maintain the charge. Therefore, the pixel electrodes PE may have different or the same potentials through independent control of the active devices T.

Note that the circuit diagram of the active device T is schematically illustrated in FIG. 1 of the embodiment, so as to illustrate the electrical connection relationship between the active device T and the signal line. Those skilled in the art may form a suitable active device configuration according to the actual configuration relationship between the pixel structure and the signal line. Therefore, the detailed structure of the active device T is not illustrated in FIG. 1.

For example, the gate GE of the active device T and the signal line SL2 may belong to a metal conductive layer, and the conductive layer is directly disposed on a substrate surface 100s of the substrate 100. The source SE, the drain DE, and the signal line SL1 of the active device T may belong to another metal conductive layer, and the insulating layer IL1 is disposed between the two metal conductive layers, but the disclosure is not limited thereto. In the embodiment, the pixel electrode PE is a light-transmitting electrode, for example, and the material of the light-transmitting electrode includes metal oxides, such as indium tin oxide, indium zinc oxide, aluminum tin oxide, aluminum zinc oxide, other suitable oxides, or a stacked layer of at least two thereof. However, the disclosure is not limited thereto, and according to other embodiments, the pixel electrode PE may also be a reflective electrode. The material of the reflective electrode includes metals, alloys, nitrides of metallic materials, oxides of metallic materials, oxynitrides of metallic materials, other suitable materials, or a stacked layer of metallic materials of other conductive materials.

In the embodiment, the pixel array substrate 10 may be configured for driving the display of a liquid crystal display (LCD) panel. The liquid crystal display panel may include the pixel array substrate 10, an opposite substrate (not shown), and a liquid crystal layer (not shown) sandwiched between the pixel array substrate 10 and the opposite substrate. The electric field formed between each pixel electrode PE of the pixel array substrate 10 and the conductive layer on the opposite substrate may drive multiple liquid crystal molecules in the liquid crystal layer to rotate. The size of the electric field may determine the optical axis distribution of the liquid crystal molecules, which in turn allows the incident polarized light to produce a corresponding phase delay and cause its polarization state to change, and then the emitted light has a corresponding brightness. Therefore, the pixel electrodes PE with different potentials may allow the emitted light to have different light intensities, thereby achieving the effect of image display.

However, the disclosure is not limited thereto. In other embodiments, the pixel structure of the pixel array substrate and the configuration of signal lines may also be adjusted to be adapted for driving the display of organic light emitting diode (OLED) panels, micro light emitting diode (micro-LED) panels, or sub-millimeter light emitting diode (mini light emitting diode, mini-LED) panel display driver.

In the embodiment, the pixel array substrate 10 further includes multiple conductive patterns CP1 respectively disposed between the signal lines SL1 (or the signal lines SL2) and are electrically insulated from the signal lines. The conductive pattern CP1 has a connection main portion CP1a and two extension sections CP1b extending from opposite sides of the connection main portion CP1a. Note that the two extension sections CP1b are each adjacent to one side of a corresponding signal line SL1. The extension sections CP1b extend along the direction Y on opposite sides of the pixel electrode PE. That is, the extension direction of the extension sections CP1b is parallel to the extension direction of the signal line SL1.

On the other hand, the connection main portions CP1a of the conductive patterns CP1 disposed in the direction X are connected to one another so that these conductive patterns CP1 have the same potential. For example, when the pixel electrodes PE overlapped with the conductive patterns CP1 are enabled, the conductive patterns CP1 may have a ground potential to suppress the electrical interference between the pixel electrode PE and the adjacent signal line SL1. In other words, the conductive pattern CP1 may serve as a shielding electrode, but the disclosure is not limited thereto. In the embodiment, the conductive patterns CP1 and the signal lines SL2 may optionally belong to the same film layer, but it is not limited thereto.

Furthermore, to suppress the capacitive coupling effect between the signal line SL1 and the conductive pattern CP1, the pixel array substrate 10 further includes multiple insulation patterns IP, and the signal lines SL1 are disposed on the insulation patterns IP, respectively. Accordingly, the distance between the conductive pattern CP1 and the signal line SL1 is increased. From another point of view, the signal lines SL1 are completely overlapped with the insulation patterns IP in the normal direction (a direction Z) of the substrate surface 100s. In the embodiment, the signal lines SL1 each have a width W1 in the configuration direction (e.g., the direction X), the insulation patterns IP each have a width W2 in the configuration direction, and the width W1 of the signal line SL1 is less than the width W2 of the insulation pattern IP, but the disclosure is not limited thereto. In other embodiments, the width W1 of the signal line SL1 may also be substantially equal to the width W2 of the insulation pattern IP.

In the embodiment, the insulation pattern IP has a side edge IPe1 and a side edge IPe2 opposite to each other in the direction X, and the signal line SL1 has an edge SL1e1 and an edge SL1e2 opposite to each other in the direction X. There is a first distance d1 between the side edge SL1e1 of each signal line SL1 and the side edge IPe1 of one of the insulation patterns IP overlapped with the signal line SL1. There is a second distance d2 between the side edge SL1e2 of each signal line SL1 and the side edge IPe2 of one of the insulation patterns IP overlapped with the signal line SL1. The first distance d1 and the second distance d2 are greater than or equal to 3 µm and less than or equal to the width W1 of the signal line SL1. However, the disclosure is not limited thereto. According to other embodiments, when the process accuracy (e.g., the alignment accuracy of the insulation pattern IP and the signal line SL1) is better or the line width variation of the signal line SL1 is small, the first distance d1 and the second distance d2 may also be greater than or equal to 0 µm.

For example, in the embodiment, the first distance d1 between the side edge IPe1 of the insulation pattern IP and the side edge SL1e1 of the signal line SL1 is substantially equal to the second distance d2 between the side edge IPe2 of the insulation pattern IP and the side edge SL1e2 of the signal line SL1. However, the disclosure is not limited thereto. According to other embodiments, the first distance between the insulation pattern IP and one side of the signal line SL1 may also not equal to the second distance d2 between the insulation pattern IP and the other side of the signal line SL1.

On the other hand, in the embodiment, a thickness t1 of the insulation pattern IP in the thickness direction (e.g., the direction Z) may be optionally less than a thickness t2 of the signal line SL1 in the thickness direction, but the disclosure is not limited thereto. Specifically, the insulation pattern IP may also have at least one recess structure RS recessed from a surface IPs, such as multiple recess structures RS in the embodiment. The signal lines SL1 extend on the surfaces IPs of the insulation patterns IP and are filled the recess structures RS. In other words, the signal lines SL1 of the embodiment may be divided into two portions. One is a portion SL1a covering the surface IPs of the insulation pattern IP (or disposed outside the recess structure RS), and the other is a portion SL1b extending into the recess structure RS of the insulation pattern IP.

Note that the extension direction of the recess structures RS is parallel to the extension direction of the signal lines SL1 (or the insulation patterns IP), but the disclosure is not limited thereto. In other embodiments, the extension direction of the recess structure may also intersect the extension direction of the signal line SL1. On the other hand, the vertical projection of the recess structure RS on the substrate surface 100s has a width W3 of the signal line SL1 in the configuration direction (e.g., the direction X), the portion SL1a of the signal line SL1 outside the recess structure RS has a thickness t3 in the normal direction (e.g., the direction Z) of the substrate surface 100s, and the width W3 of the recess structure RS may be less than or equal to two times the thickness t3 of the portion SL1a of the signal line SL1. In the embodiment, the width W3 of the recess structure RS is less than two times (or even one time) the thickness t3 of the portion SL1a of the signal line SL1.

For example, in the embodiment, the width W3 of the recess structure RS may be less than 1 µm, and the thickness t1 of the insulation pattern IP may be greater than 2.5 µm, but the disclosure is not limited thereto. To have a better high aspect ratio of the recess structure RS, the material of the insulation pattern IP may include a photoresist material with high sensitivity, such as SU-8, polymethylmethacrylate (PMMA), or photoresist materials including siloxane base.

Note that with the configuration of the recess structures RS, the portion SL1b of the signal line SL1 extending into the recess structures RS may effectively reduce the overall resistance of the signal line SL1, which contributes to further improving the charging and discharging capability of the driving circuit of the pixel array substrate 10. Moreover, the overall stress distribution of the pixel array substrate 10 may be prevented from changing due to the increase in the film thickness of the signal line SL1, which subjects the substrate 100 to fragility. In other words, the process window of the pixel array substrate 10 may be increased, which contributes to the improvement of the process yield.

On the other hand, the quantity of the recess structures RS on the insulation pattern IP may be adjusted according to different designs of the signal line SL1. For example, in the embodiment, to reduce the parasitic capacitance between the signal line SL1 and the signal line SL2 (or the connection main portion CP1a of the conductive pattern CP1), the signal line SL1 is overlapped with the part of the signal line SL2 and the connection main portion CP1a of the conductive pattern CP1 in the normal direction (e.g., the direction Z) of the substrate surface 100s, and the width in the direction X is less than the width of other parts of the signal line SL1 in the direction X. Therefore, in the insulation pattern IP, recess structures in different quantities may be disposed in the area of the two parts overlapped with the signal line SL1. For example, two recess structures RS are disposed in the area overlapped with the signal line SL2 and the connection main portion CP1a (as shown in FIG. 2B), and eight recess structures RS are disposed in the area not overlapped with the signal line SL2 and the connection main portion CP1a (as shown in FIG. 2A). However, the disclosure is not limited thereto. In other embodiments, in the insulation pattern, the recess structures RS in the same quantity are disposed in all areas overlapped with the signal line SL1, and the extension length of each recess structure RS is equal to the extension length of the signal line SL1.

Furthermore, the pixel array substrate 10 may also optionally include the color filter layer CF and the planarization layer PL. The color filter layer CF covers the signal lines SL1, and the insulating layer IL2 is further disposed between the color filter layer CF and the signal lines SL1. The planarization layer PL is disposed on the color filter layer CF, and the pixel electrode PE of the pixel structure PX is disposed on the planarization layer PL. However, the disclosure is not limited thereto. According to other embodiments, the color filter layer CF may not be disposed on the pixel array substrate and may be replaced by at least one insulating material layer, instead. The material of the planarization layer PL is an organic insulating material, for example, and the organic insulating material may include polyimide, polyester, benzocyclobutene (BCB), polymethylmethacrylate (PMMA), poly(4-vinylphenol) (PVP), polyvinyl alcohol (PVA), polytetrafluoroethene (PTFE), hexamethyldisiloxane (HMDSO).

The pixel array substrate 10 may also optionally include multiple conductive patterns CP2, so that the electric field generated by the signal line SL1 and escaping from the planarization layer PL may be reduced, and the alignment state of some liquid crystal molecules of the liquid crystal layer adjacent to the signal line SL1 may not be affected. The conductive patterns CP2 are disposed directly above the signal lines SL1, respectively. For example, the materials of the conductive patterns CP2 and the pixel electrodes PE may be the same. That is, the conductive pattern CP2 and the pixel electrode PE may belong to the same film layer, but the disclosure is not limited thereto.

In the subsequent paragraphs, the same elements will be given the same reference numerals and the same illustration for the technical content will be omitted. For the omitted parts, refer to the foregoing embodiments, which may not be repeated hereafter.

Figure 3:
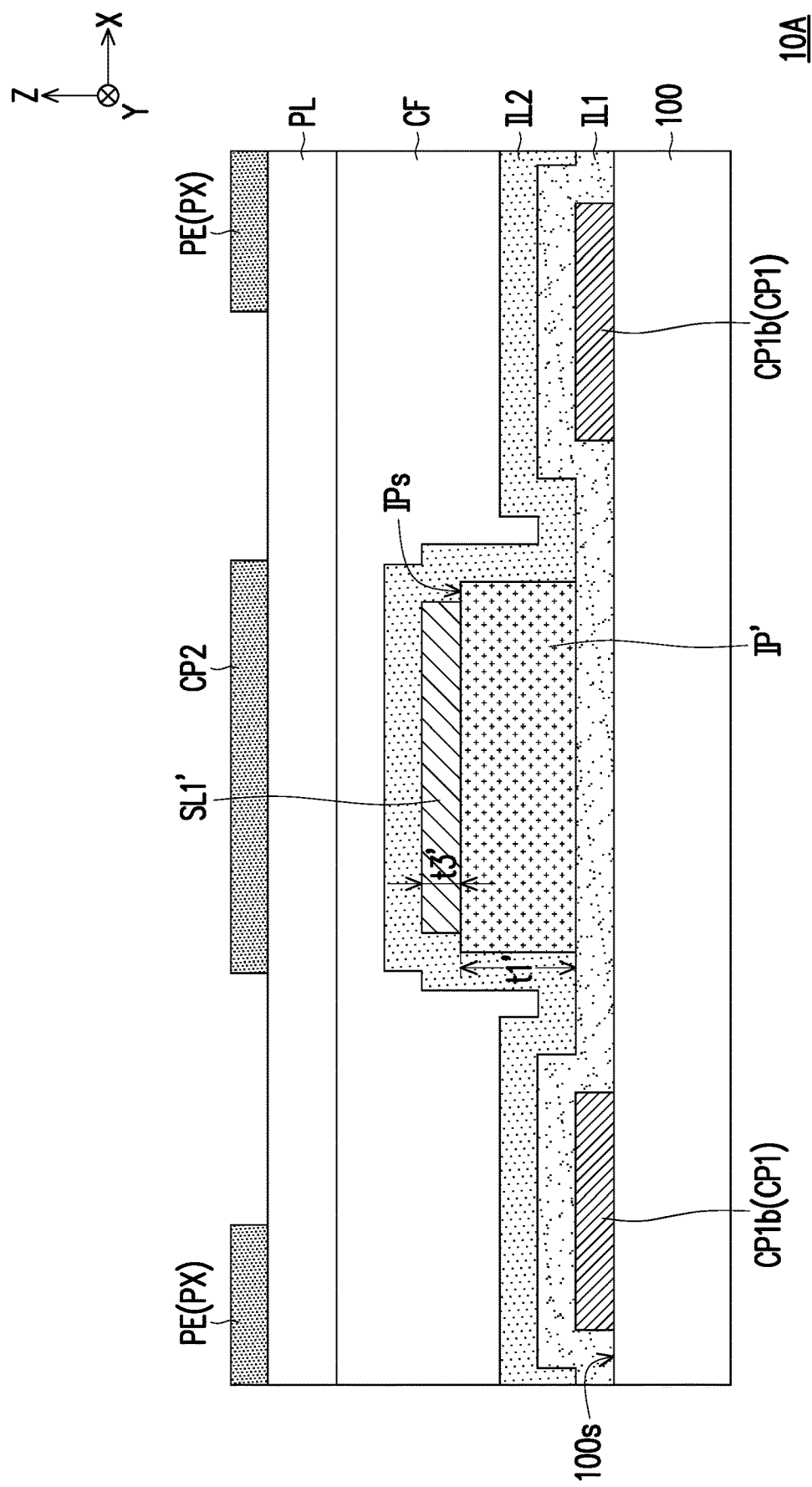
FIG. 3 is a schematic cross-sectional view of a pixel array substrate according to a second embodiment of the disclosure.

FIG. 3 is a schematic cross-sectional view of a pixel array substrate according to a second embodiment of the disclosure. Referring to FIG. 3, the difference between a pixel array substrate 10A of the embodiment and the pixel array substrate 10 of FIG. 2A is that an insulation pattern IP' of the pixel array substrate 10A does not have the recess structure RS of FIG. 2A. That is, in the embodiment, the signal line SL1' does not have the portion SL1b of the signal line SL1 extending into the recess structure RS in FIG. 2A.

In the embodiment, a thickness t1' of the insulation pattern IP' in the thickness direction (e.g., the direction Z) is greater than a thickness t3' of the signal line SL1' in the thickness direction. With the configuration of the insulation pattern IP', the distance between the signal line SL1' and the conductive pattern CP1 may be increased, thereby suppressing the capacitive coupling effect between the signal line SL1' and the conductive pattern CP1, which contributes to improving the charging and discharging capability of the driving circuit of the pixel array substrate 10A.

Figure 4:
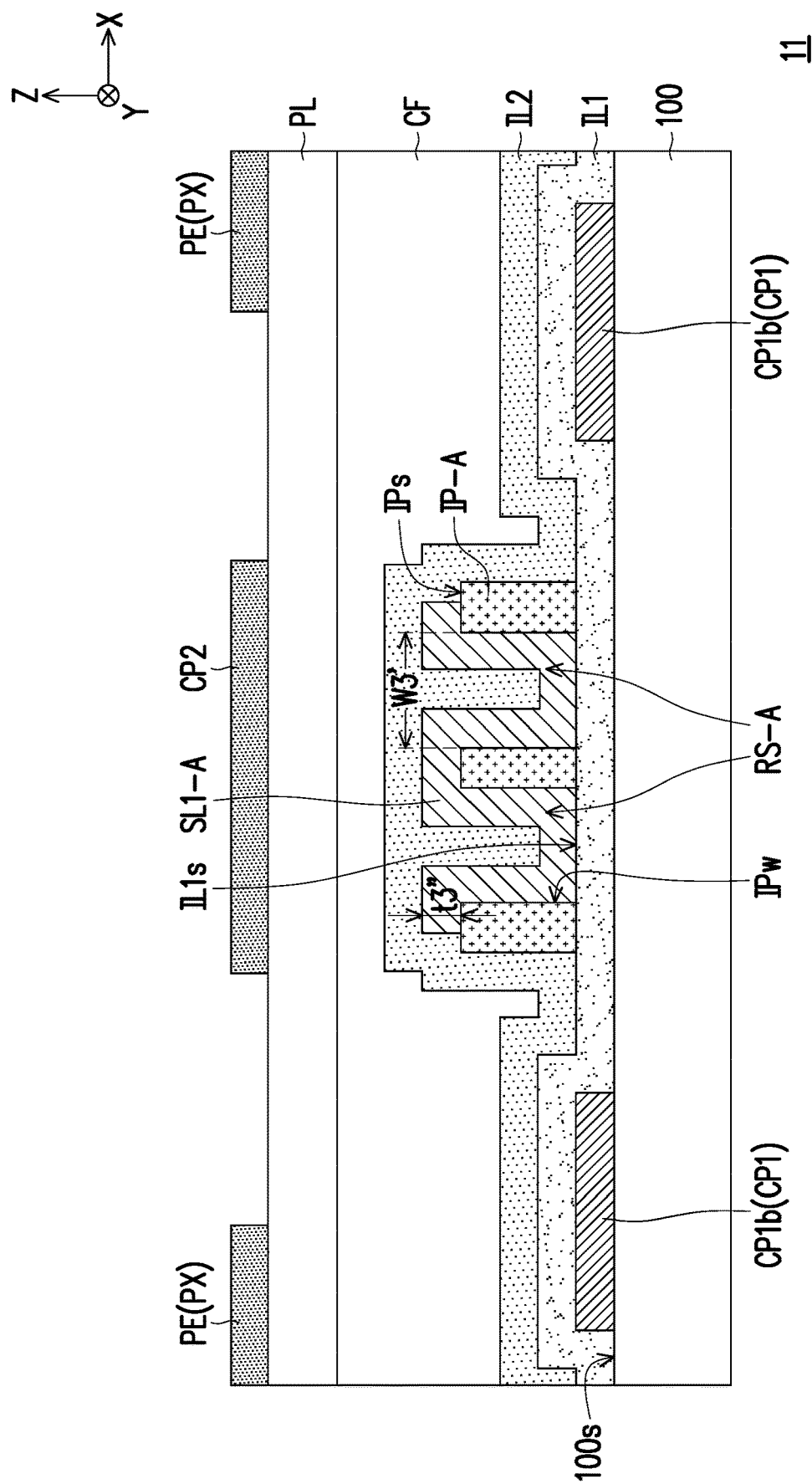
FIG. 4 is a schematic cross-sectional view of a pixel array substrate according to a third embodiment of the disclosure.

FIG. 4 is a schematic cross-sectional view of a pixel array substrate according to a third embodiment of the disclosure. Referring to FIG. 4, the difference between a pixel array substrate 11 of the embodiment and the pixel array substrate 10 of FIG. 2A is that the quantity and the width of the recess structures of the insulation pattern are different. Specifically, the number of recess structures RS-A of an insulation pattern IP-A is two, and a width W3' of the vertical projection of the recess structure RS-A on the substrate surface 100s in the direction X is significantly greater than the width W3 of the vertical projection of the recess structure RS on the substrate surface 100s of FIG. 2A in the direction X.

In the embodiment, the width W3' of the vertical projection of the recess structure RS-A on the substrate surface 100s in the direction X is greater than two times thickness t3" of the portion of the signal line SL1-A outside the recess structure RS-A in the thickness direction (e.g., the direction Z). For example, the width W3' of the recess structure RS-A of the embodiment may be greater than 2 µm. Therefore, the signal line SL1-A may extend from the surface IPs of the insulation pattern IP-A to a sidewall IPw of the recess structure RS-A defined by the insulation pattern IP-A and the surface IL1s of the recess structure RS-A defined by the insulating layer IL1.

More specifically, the film thickness of the signal line SL1-A of the embodiment is not increased with the configuration of the recess structure RS-A, but the effective width of the signal line SL1-A is increased significantly since the signal line SL1-A is conformed to the recess structures RS of the insulation pattern IP-A. The effective width refers to the total length of the extension path of the signal line SL1-A on the XZ plane. Accordingly, the overall resistance of the signal line SL1-A may be reduced, which contribute to improving the charging and discharging capability of the driving circuit of the pixel array substrate 11.

Moreover, since the overall resistance of the signal line SL1-A is not reduced through the increase of the film thickness, the overall stress distribution of the pixel array substrate 11 may be further prevented from changing due to the increase in the film thickness of the signal line, which subjects the substrate 100 to fragility. In other words, the process window of the pixel array substrate 11 may be increased, which contributes to the improvement of the process yield.

Figure 5:
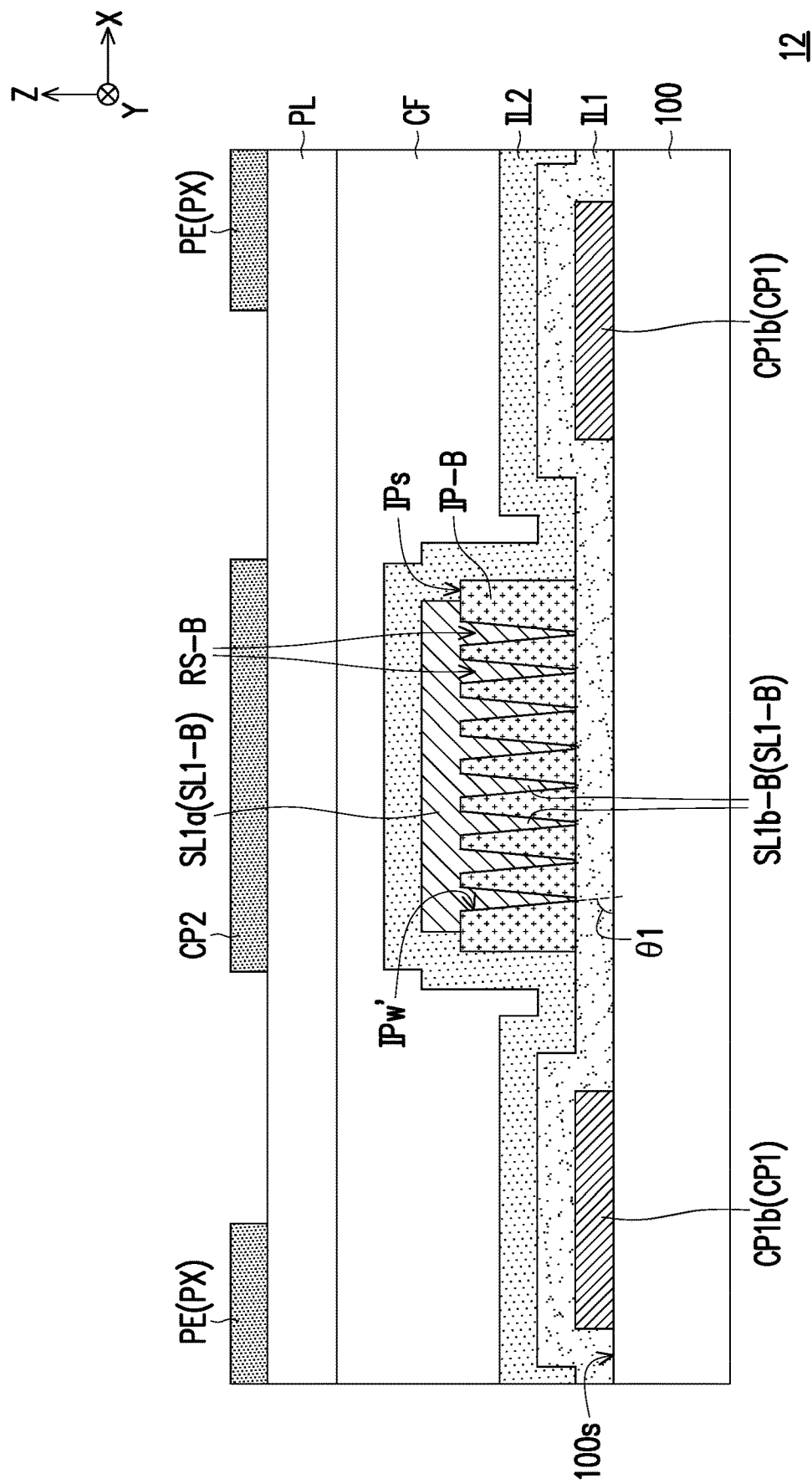
FIG. 5 is a schematic cross-sectional view of a pixel array substrate according to a fourth embodiment of the disclosure.

FIG. 5 is a schematic cross-sectional view of a pixel array substrate according to a fourth embodiment of the disclosure. Referring to FIG. 5, the difference between a pixel array substrate 12 of the embodiment and the pixel array substrate 10 of FIG. 2A is that the configuration shape of the recess structure is different. In the embodiment, the cross-sectional profile (e.g., the XZ plane) of a recess structure RS-B of an insulation pattern IP-B is V-shaped, which is different from the rectangular cross-sectional profile of the recess structure RS of FIG. 2A. For example, an angle θ1 between an inclined surface IPw' of the insulation pattern IP-B defining the recess structure RS-B and the substrate surface 100s is greater than 60 degrees. Therefore, the cross-sectional profile of a portion SL1b-B of a signal line SL1-B filled in the recess structure RS-B of the embodiment is also V-shaped.

The size relationship and the configuration method of the insulation pattern IP-B and the signal line SL1-B of the embodiment are similar to the size relationship and the configuration method of the insulation pattern IP and the signal line SL1 in FIG. 2A, so for detailed illustration thereof, refer to the relevant paragraphs of the foregoing embodiments, which may not be repeated herein.

Figure 6:
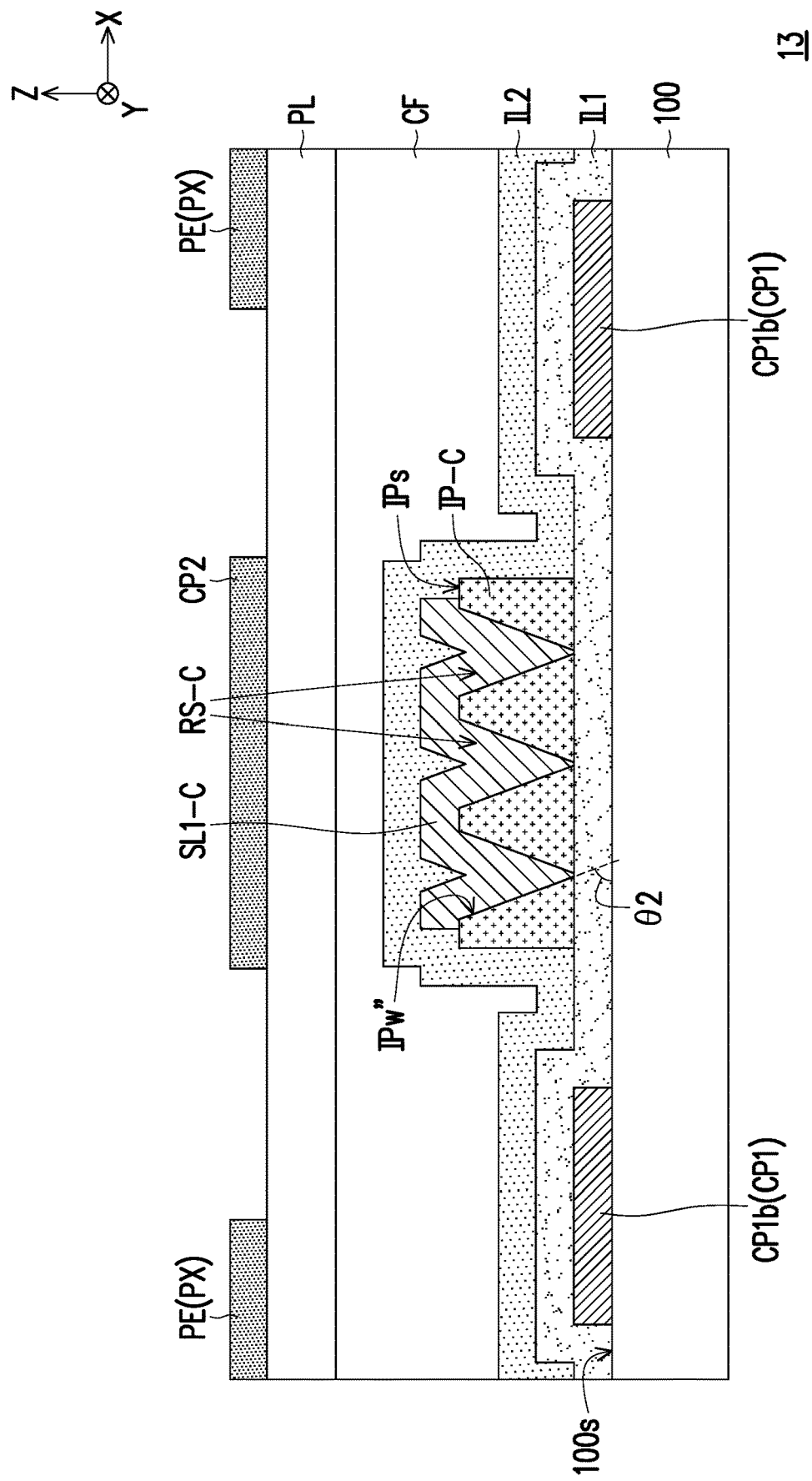
FIG. 6 is a schematic cross-sectional view of a pixel array substrate according to a fifth embodiment of the disclosure.

FIG. 6 is a schematic cross-sectional view of a pixel array substrate according to a fifth embodiment of the disclosure. Referring to FIG. 6, the difference between a pixel array substrate 13 of the embodiment and the pixel array substrate 11 of FIG. 4 is that the quantity and the cross-sectional profile of the recess structures are different. In the embodiment, the cross-sectional profile (e.g., the XZ plane) of a recess structure RS-C of an insulation pattern IP-C is V-shaped, which is different from the rectangular cross-sectional profile of the recess structure RS-A of FIG. 4. For example, an angle θ2 between an inclined surface IPw" of the insulation pattern IP-C defining the recess structure RS-C and the substrate surface 100s is greater than 60 degrees.

The size relationship and the configuration method of the insulation pattern IP-C and the signal line SL1-C of the embodiment are similar to the size relationship and the configuration method of the insulation pattern IP-A and the signal line SL1-A in FIG. 4, so for detailed illustration thereof, refer to the relevant paragraphs of the foregoing embodiments, which may not be repeated herein. Note that the film thickness of the signal line SL1-C of the embodiment is not increased with the configuration of the recess structure RS-C, but the effective width of the signal line SL1-C is increased significantly since the signal line SL1-C is conformed to the recess structures RS-C of the insulation pattern IP-C. The effective width refers to the total length of the extension path of the signal line SL1-c on the XZ plane. Accordingly, the overall resistance of the signal line SL1-c may be reduced, which contribute to improving the charging and discharging capability of the driving circuit of the pixel array substrate 13.

On the other hand, since the overall resistance of the signal line SL1-C is not reduced through the increase of the film thickness, the overall stress distribution of the pixel array substrate 13 may be further prevented from changing due to the increase in the film thickness of the signal line, which subjects the substrate 100 to fragility. In other words, the process window of the pixel array substrate 13 may be increased, which contributes to the improvement of the process yield.

Figure 7:
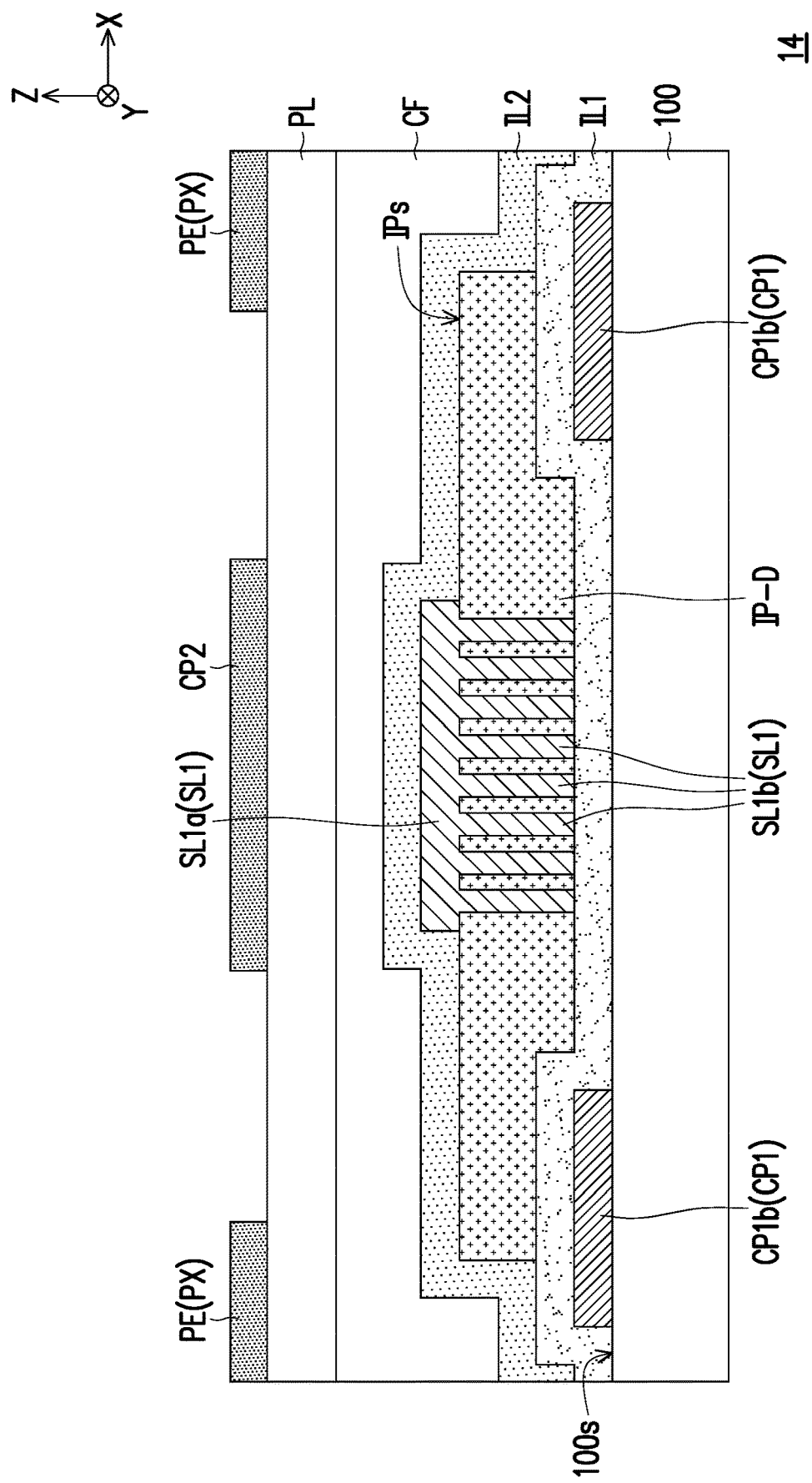
FIG. 7 is a schematic cross-sectional view of a pixel array substrate according to a sixth embodiment of the disclosure.

FIG. 7 is a schematic cross-sectional view of a pixel array substrate according to a sixth embodiment of the disclosure. Referring to FIG. 7, the difference between a pixel array substrate 14 of the embodiment and the pixel array substrate 10 of FIG. 2A is that the coverage of the insulation pattern is different. For example, in the embodiment, an insulation pattern IP-D may partially cover the conductive pattern CP1 in the normal direction (e.g., the direction Z) of the substrate surface 100s. Accordingly, the capacitive coupling effect between the signal line SL1 and the conductive pattern CP1 may be further suppressed, which contributes to improving the charging and discharging capability of the driving circuit of the pixel array substrate 14. However, the disclosure is not limited thereto. In other unillustrated embodiments, the insulation pattern may also completely cover the conductive pattern CP1.

In summary, in the pixel array substrate of an embodiment of the disclosure, the recess structure is disposed on the insulation pattern, and the signal line electrically connected to the pixel structure is disposed on the insulation pattern and filled in the recess structure. Accordingly, the overall resistance of the signal line may be reduced, which contributes to improving the charging and discharging capability of the driving circuit of the pixel array substrate. In the pixel array substrate of another embodiment of the disclosure, with the configuration of the insulation pattern, the distance between the signal line and the conductive pattern may be increased, and thereby the capacitive coupling effect between the signal line and the conductive pattern is suppressed, which contributes to improving the charging and discharging capability of the driving circuit of the pixel array substrate.

What is claimed is:

1. A pixel array substrate, comprising:
    a substrate;
    a plurality of insulation patterns disposed on the substrate, wherein each of the insulation patterns comprises at least one recess structure;
    a plurality of signal lines disposed on the insulation patterns, respectively, wherein each of the signal lines is filled in the at least one recess structure of one of the insulation patterns, and an extension direction of the at least one recess structure is parallel to an extension direction of the signal lines;
    a plurality of pixel structures disposed on the substrate and electrically connected to the signal lines, respectively;
    a color filter layer covering the signal lines; and
    a planarization layer disposed on the color filter layer, wherein each of the pixel structures comprises an active device and a pixel electrode, the active device is electrically connected between the pixel electrode and one of the signal lines, and the pixel electrode is disposed on the planarization layer.

2. The pixel array substrate according to claim 1, wherein the signal lines comprise a first width in a configuration direction of the insulation patterns, respectively, the insulation patterns comprise a second width in the configuration direction, respectively, and the first width is less than or equal to the second width.

3. The pixel array substrate according to claim 1, wherein each of the insulation patterns comprises a plurality of recess structures.

4. The pixel array substrate according to claim 3, wherein a first thickness of the insulation patterns in a thickness direction is less than a second thickness of the signal lines in the thickness direction.

5. The pixel array substrate according to claim 3, wherein vertical projections of the recess structures on a substrate surface of the substrate respectively comprise a width in a configuration direction of the signal lines, a part of the signal lines disposed outside the recess structures comprise a thickness in a normal direction of the substrate surface, and the width of each of the recess structures is less than or equal to two times the thickness of the signal lines.

6. The pixel array substrate according to claim 3, wherein a first thickness of the insulation patterns in a thickness direction is greater than a second thickness of the signal lines in the thickness direction.

7. The pixel array substrate according to claim 3, wherein vertical projections of the recess structures on a substrate surface of the substrate respectively comprise a width in a configuration direction of the signal lines, a part of the signal lines disposed outside the recess structures comprise a thickness in a normal direction of the substrate surface, and the width of each of the recess structures is greater than two times the thickness of the signal lines.

8. The pixel array substrate according to claim 3, wherein a cross-sectional profile of the recess structures is V-shaped.

9. The pixel array substrate according to claim 3, wherein an angle between an inclined surface of each of the insulation patterns defining each of the recess structures and a substrate surface of the substrate is greater than 60 degrees.

10. The pixel array substrate according to claim 1, further comprising:
    a plurality of conductive patterns disposed adjacent to the signal lines and electrically insulated from the signal lines, wherein an extension direction of the conductive patterns is parallel to the extension direction of the signal lines, and the insulation patterns at least partially cover the conductive patterns.

11. The pixel array substrate according to claim 1, wherein each of the insulation patterns further comprises a first side edge and a second side edge opposite to each other in a direction, each of the signal lines comprises a third side edge and a fourth side edge opposite to each other in the direction, there is a first distance between the third side edge of each of the signal lines and the first side edge of one of the insulation patterns overlapped with the each of the signal lines, there is a second distance between the fourth side edge of each of the signal lines and the second side edge of one of the insulation patterns overlapped with the each of the signal lines, the first distance and the second distance are greater than or equal to 0 μm and less than or equal to a width of each of the signal lines in the direction.

12. A pixel array substrate, comprising:
a substrate;
a plurality of insulation patterns disposed on a substrate surface of the substrate and disposed along a configuration direction;
a plurality of signal lines disposed on the insulation patterns, respectively, a first thickness of the insulation patterns in a thickness direction is greater than a second thickness of the signal lines in the thickness direction, and a first width of each of the signal lines in the configuration direction is less than or equal to a second width of each of the insulation patterns in the configuration direction;
a plurality of conductive patterns disposed adjacent to the signal lines and electrically insulated from the signal lines; and
a plurality of pixel structures disposed on the substrate and electrically connected to the signal lines, respectively, wherein each of the insulation patterns further comprises a first side edge and a second side edge opposite to each other in the configuration direction, each of the signal lines comprises a third side edge and a fourth side edge opposite to each other in the configuration direction, there is a first distance between the third side edge of each of the signal lines and the first side edge of one of the insulation patterns overlapped with the each of the signal lines, there is a second distance between the fourth side edge of each of the signal lines and the second side edge of one of the insulation patterns overlapped with the each of the signal lines, the first distance and the second distance are greater than or equal to 0 μm and less than or equal to a width of each of the signal lines in the direction.

13. A pixel array substrate, comprising:
a substrate;
a plurality of insulation patterns disposed on a substrate surface of the substrate and disposed along a configuration direction;
a plurality of signal lines disposed on the insulation patterns, respectively, a first thickness of the insulation patterns in a thickness direction is greater than a second thickness of the signal lines in the thickness direction, and a first width of each of the signal lines in the configuration direction is less than or equal to a second width of each of the insulation patterns in the configuration direction;
a plurality of conductive patterns disposed adjacent to the signal lines and electrically insulated from the signal lines; and
a plurality of pixel structures disposed on the substrate and electrically connected to the signal lines, respectively, wherein each of the insulation patterns comprises a plurality of recess structures, the signal lines are filled in the recess structures of the insulation patterns, and an extension direction of the recess structures is parallel to an extension direction of the signal lines.

14. The pixel array substrate according to claim 13, wherein vertical projections of the recess structures on a substrate surface of the substrate respectively comprise a width in a configuration direction of the signal lines, a part of the signal lines disposed outside the recess structures comprise a thickness in a normal direction of the substrate surface, and the width of each of the recess structures is greater than two times the thickness of the signal lines.

15. The pixel array substrate according to claim 13, wherein a cross-sectional profile of the recess structures is V-shaped.

16. The pixel array substrate according to claim 13, wherein an angle between an inclined surface of each of the insulation patterns defining each of the recess structures and a substrate surface of the substrate is greater than 60 degrees.

17. The pixel array substrate according to claim 12, wherein an extension direction of the conductive patterns is parallel to an extension direction of the signal lines, and the insulation patterns at least partially cover the conductive patterns.

18. The pixel array substrate according to claim 12, further comprising:
a color filter layer covering the signal lines; and
a planarization layer disposed on the color filter layer, wherein each of the pixel structures comprises an active device and a pixel electrode, the active device is electrically connected between the pixel electrode and one of the signal lines, and the pixel electrode is disposed on the planarization layer.

* * * * *